Feb. 14, 1956
C. E. BERRY
2,734,949
DEVICE FOR AUTOMATICALLY AND PERIODICALLY
CORRECTING THE ZERO DRIFT IN AN AMPLIFIER
Filed Aug. 17, 1951
3 Sheets-Sheet 1
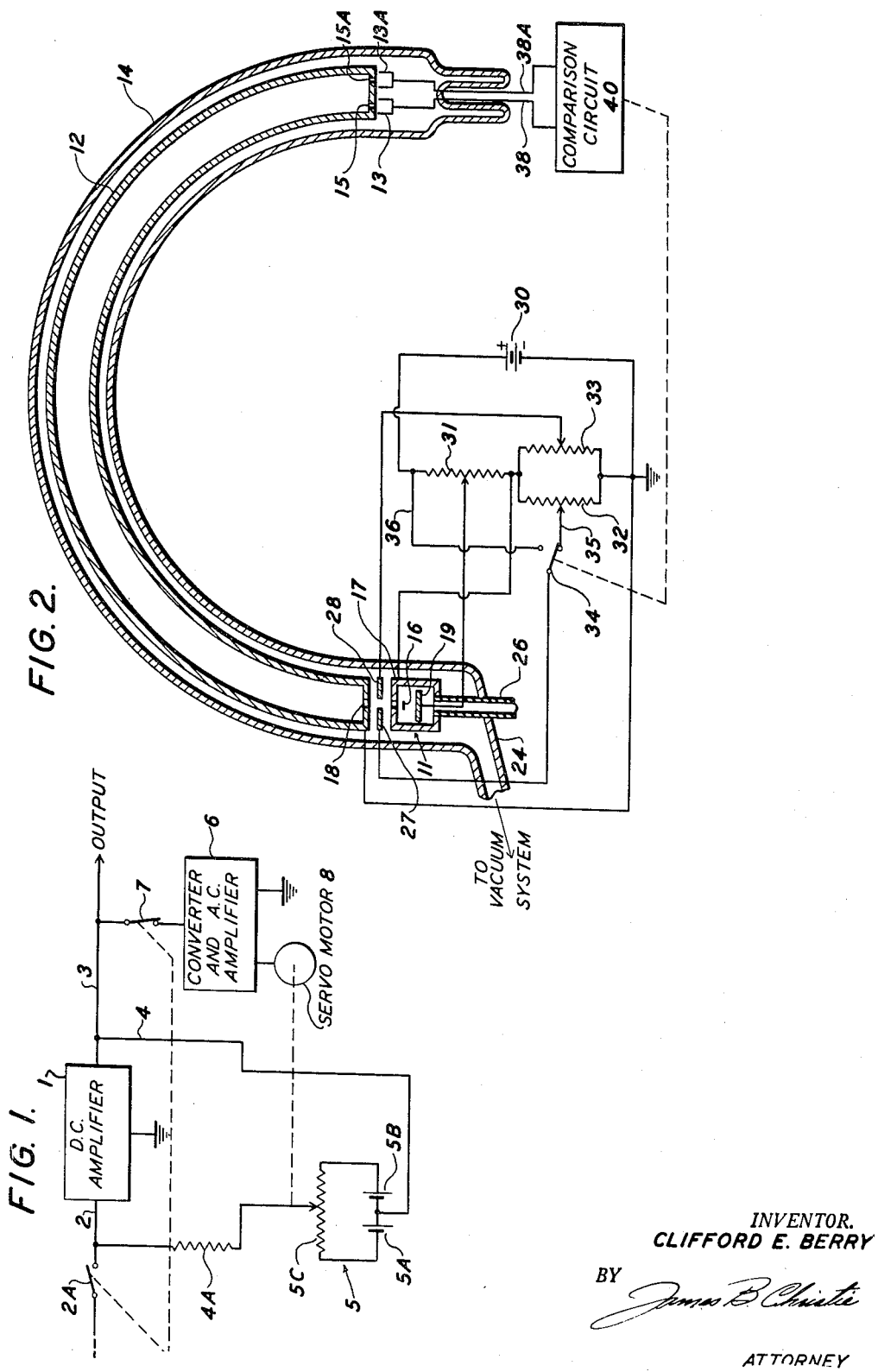
INVENTOR.
CLIFFORD E. BERRY
BY
James B Christie
ATTORNEY

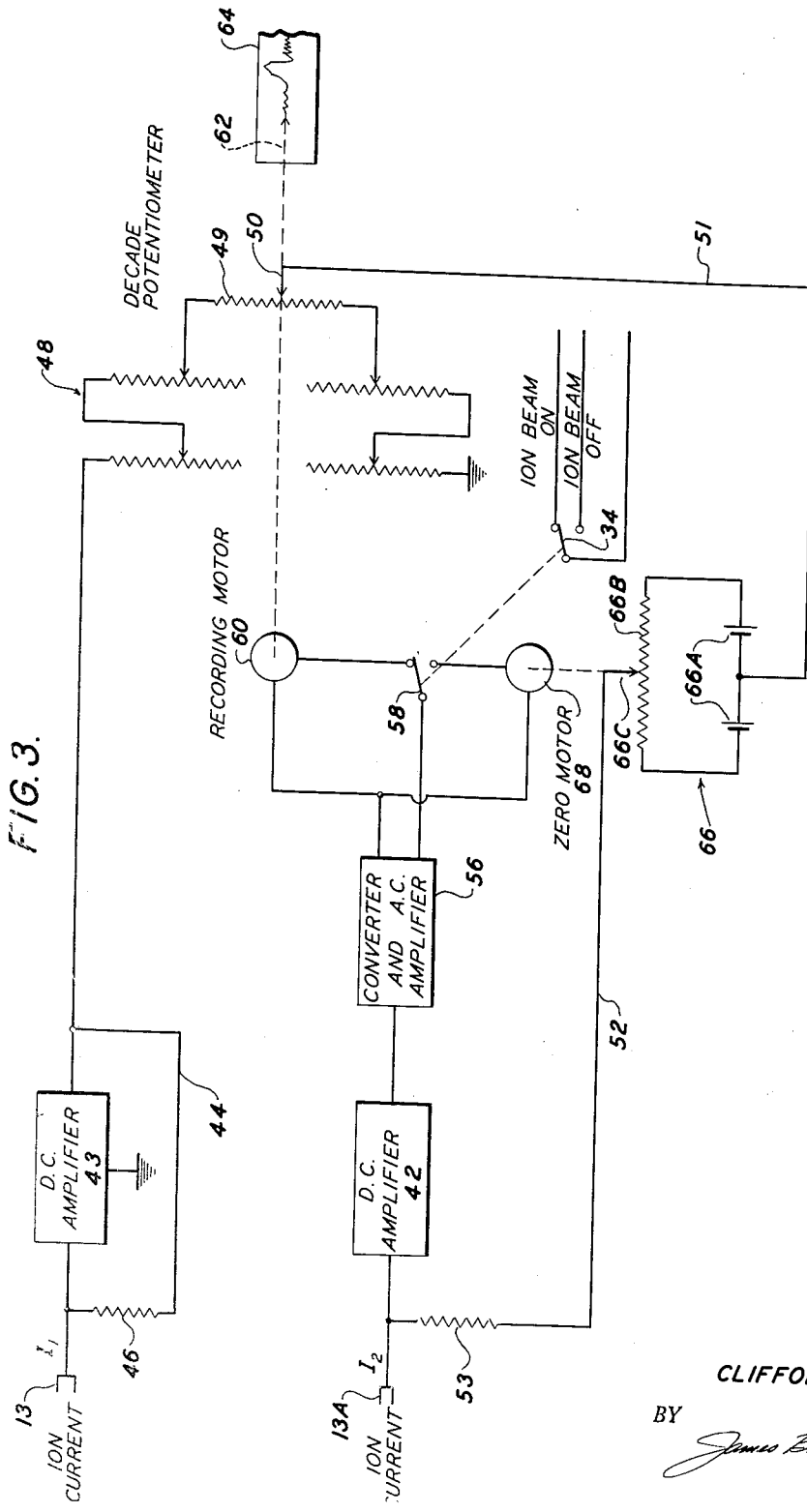

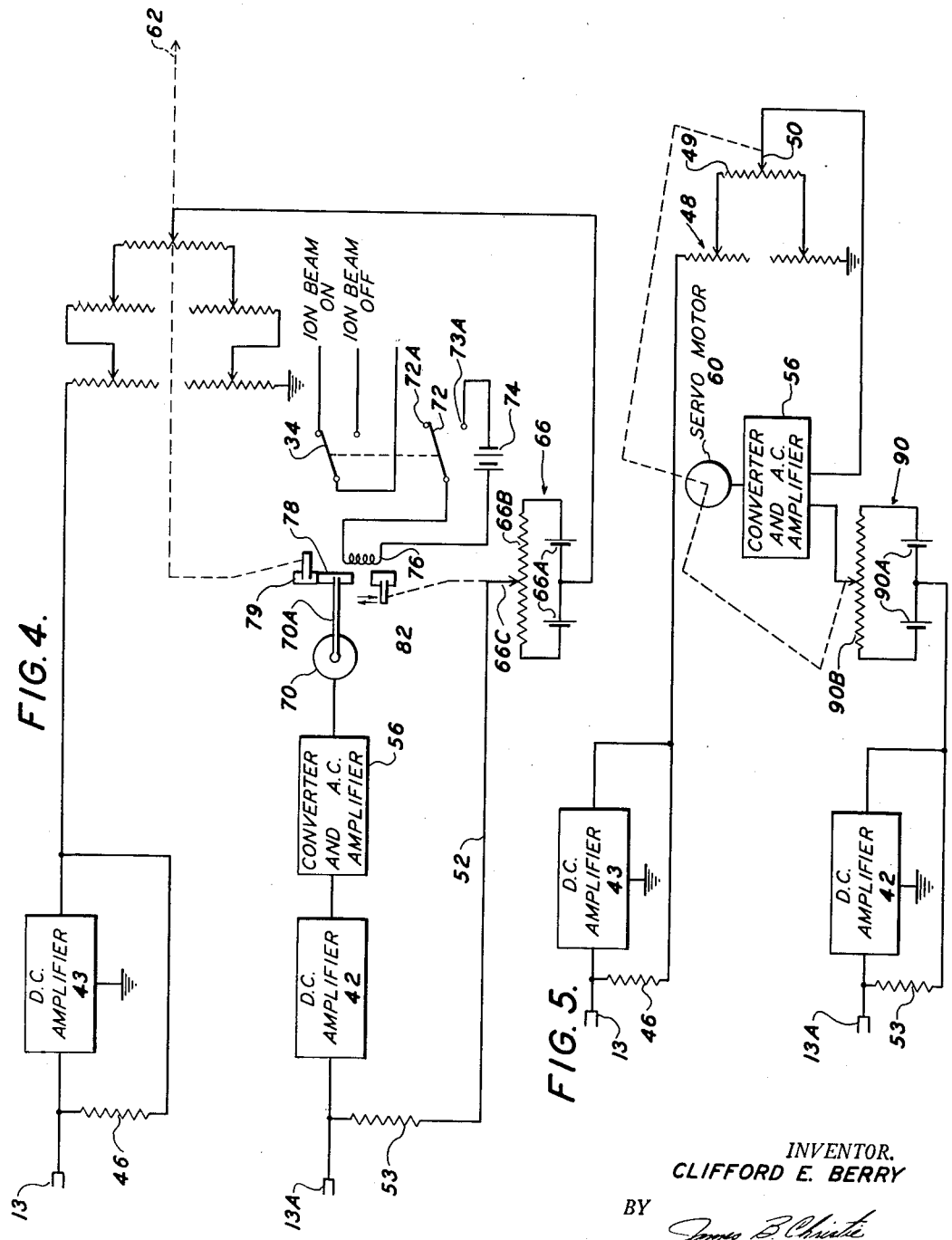

United States Patent Office 2,734,949
Patented Feb. 14, 1956

2,734,949

DEVICE FOR AUTOMATICALLY AND PERIODI-
CALLY CORRECTING THE ZERO DRIFT IN AN
AMPLIFIER

Clifford E. Berry, Altadena, Calif., assignor to Consolidated Engineering Corporation, Pasadena, Calif., a corporation of California Application August 17, 1951, Serial No. 242,296

10 Claims. (Cl. 179—171)

This invention relates to improvements in comparison circuits and particularly to such circuits as employed in automatic ratio recording systems, as for example, in mass spectrometers.

The invention is applicable to any comparison circuit in which accuracy is a function of the zero balance of D. C. electrometers in the circuit and provides means for automatically maintaining the zero balance of such components. In addition, the invention is directed to automatic balancing of a single D. C. amplifier or electrometer independent of associated circuitry. The invention is conveniently described in one aspect with relation to its use in isotope ratio mass spectrometry.

Briefly, a mass spectrometer is an analytical instrument which sorts ions. A typical mass spectrometer includes an ion source for ionizing a sample under investigation, an analyzer chamber through which ions formed in the source are propelled and in which they are segregated in accordance with their mass-to-charge ratio, and one or more collector electrodes upon which one or more ion beams are focused and discharged. Discharge currents thus produced are, in magnitude, a function of the partial pressure of the molecules in the sample from which the particular ions derived.

Mass spectrometers have been adapted to measurement of isotope ratios by inclusion therein of a spaced pair of collector electrodes. One of the two electrodes in such an instrument is referred to as the "low current electrode" and at this electrode the ion beam derived from molecules of a low abundance isotope is discharged. The other electrode is referred to as the "high current electrode" and the ion beam or beams of the more abundant isotope or isotopes are simultaneously focused and discharged at this electrode. Isotope ratio measurement in this manner is not new and of itself forms no part of the present invention.

In isotope analysis it is generally desired to measure the ratio of the ion currents rather than the absolute value of either of the currents. Accordingly the amplification and recording circuit connected to the two collector electrodes is frequently arranged as a null balance network wherein the current developed at one collector is effectively divided by the other to give a recorded value representative of the indicated ratio. Ratio recording circuits of this type are illustrated and described in U. S. Patent 2,456,426 issued to Alfred O. C. Nier on December 14, 1948, and in co-pending application Serial No. 104,030, filed July 11, 1949 by Robert L. Sink.

In the ratio measuring circuit described by Sink a separate D. C. amplifier is connected to each of the high and low current collectors. The output of the high current amplifier (this being the amplifier connected to the high current collector) is connected to a potentiometer. The tap of the potentiometer is connected through a suitable resistance to the input of the low current amplifier (this being the amplifier connected to the low current collector). Unbalance output of the low current amplifier is fed through a chopper and A. C. amplifier to drive a motor, the motor being connected to adjust the tap of the potentiometer to a null balance position. The pen of a recorder is connected to indicate excursions of the potentiometer tap.

The circuit is a null balance system with the signal from the potentiometer being used to balance out input to the low current amplifier as derived from the low current collector. The high current amplifier is generally a feed-back type circuit with a unity gain. Alternatively the tapped off portion of the high current amplifier output may be introduced to the output of the low current amplifier with the accomplishment of the same objectives. In a circuit of either of these types the setting of the potentiometer connected across the output of the high current amplifier is a measure of the ratio of the discharge currents at the two collectors.

Conventional electrometer amplifiers of the type used in comparison circuits for the comparison of minute electrical signals exhibit a zero drift with time. It follows that if the drift is not compensated by some means, comparison values will be in error as a result. The present invention is directed to automatic means for periodically correcting such a zero drift. In one aspect the invention provides in a D. C. amplifier circuit including a feed-back loop, the combination comprising a variable voltage source serially connected in the feed-back loop, and means responsive to unbalanced amplifier output to adjust the variable voltage source to extinguish such output.

As mentioned above, the invention is particularly adapted for use and conveniently described with relation to incorporation in a null balance circuit of the type illustrated and described in the aforementioned co-pending application.

To carry out this objective, I provide in a comparison circuit including first and second D. C. amplifiers connected to respectively receive signals to be compared, a potentiometer connected to the output of the first amplifier, the tap of the potentiometer being connected to the second amplifier, and means responsive to circuit unbalance to adjust the potentiometer tap to balance the circuit, the combination comprising a variable voltage source connected between the tap of the potentiometer and the second amplifier, means connected in the circuit to interrupt the input signals to the amplifiers, and means operable responsive to circuit unbalance when the signals are so interrupted to vary the voltage of the variable source to balance the circuit.

The means provided for varying the auxiliary voltage to balance out the zero drift of either of the amplifiers may be the same means operable to vary the tap of the potentiometer alternately connected to the potentiometer and to the auxiliary voltage source responsive to interruption and initiation of signal input to the amplifier. Alternatively, the zero balance means may be separate from the potentiometer tap positioning means and independently operated.

The invention will be clearly understood from the following detailed description thereof taken in conjunction with the accompanying drawings, in which:

Fig. 1 is a circuit diagram showing balancing means according to the invention as applied to a D. C. amplifier;

Fig. 2 is a diagrammatic illustration of a mass spectrometer including elementary circuitry for effectuating an interruption in output signals;

Fig. 3 is a circuit diagram of a ratio measuring circuit embodying principles of the invention;

Fig. 4 is a circuit diagram showing alternative modifications in the system of Fig. 2; and Fig. 5 is a diagram of alternative circuitry for ratio measurements and embodying the invention.

The circuit of Fig. 1 includes a D. C. amplifier 1 having input and output leads 2 and 3 respectively and a feedback loop 4 connected between the output and input leads through a grid leak resistor 4A. A switch 2A is provided in the input lead, the feed-back loop being connected to this lead between the switch and amplifier. A variable voltage source 5 is connected serially in the feedback loop and includes batteries 5A, 5B connected across a slidewire 5C. A converter A. C. amplifier network 6 is parallel-coupled to the output lead 3 through a switch 7. Switches 2A and 7 are ganged so that when the former is open, the latter is closed, and vice versa. A servomotor 8 is connected to the output of the converter amplifier and is mechanically coupled to drive the tap of slidewire 5C.

In operation, input switch 2A is periodically opened to interrupt the input signal to amplifier 1, switch 7 simultaneously closing to apply any output of amplifier 1 to the converter amplifier 6. Periodic operation of the switches may be automatic or manual, as desired. With switch 2A open, any unbalance output of amplifier 1 is caused to drive the motor, the converter-amplifier serving to convert such signal to an A. C. component and amplify the A. C. component to drive the motor. Actuation of the motor in this manner effectuates adjustment of the tap of slidewire 5C to interject a voltage into the input of amplifier 1 of proper magnitude to extinguish the unbalance output. In this manner the amplifier is automatically and rapidly brought to balance.

Referring to Fig. 2, the conventional 180° isotope ratio mass spectrometer there shown diagrammatically has an ion source 11, an analyzer tube 12, a pair of ion collectors 13, 13A, all disposed within an envelope 14. Analyzer tube 12 is provided at the end adjacent ion collectors 13, 13A with resolving or exit slits 15, 15A aligned respectively with the two collectors and through which ion beams are focused on the collectors. An electron gun (not shown) is mounted in the source projecting an electron beam 16 through the source to ionize sample molecules therein. Apertured accelerating electrodes 17 and 18, together with a repeller electrode 19, propel ions from the source 11 into and through the analyzer tube.

The spectrometer is provided with an envelope exhaust line 24 which may be connected to a mercury diffusion pump, molecular pump or any appropriate evacuating system (not shown). An inlet line 26 provides means for introducing the sample to be analyzed either continuously or intermittently into the ion source.

Focusing electrodes 27, 28 are disposed intermediate the accelerating electrodes 17 and 18 and on opposite sides of the ion beam to aid in focusing the beam through the aperture in the terminal electrode 18.

A circuit for applying the necessary potentials to the several electrodes in the ion source is shown schematically. The circuit includes a voltage source 30 connected across a voltage divider network including a first resistor 31 and parallel coupled resistors 32, 33 connected serially with the resistor 31 across the source 30. The repeller electrode 19 is connected toward the positive end of the divider network. The first accelerating electrode 17 is connected intermediate the positive and grounded negative end of the network, and the terminal accelerating electrode 18 is grounded. Focusing electrode 28 is connected to one of the parallel coupled resistors 33, and focusing electrode 27 is connected to a switch 34, the switch making contact either with a tap 35 of the other parallel coupled resistor 32 or with a lead 36 connected to the positive end of the divider. The object of the switch is to periodically vary the potential applied to the focusing electrode 27 between the value determined by the tap 35 and the full positive voltage of the source 30. With the potential of the focusing electrode 27 at this latter value the ion beam passing through the first accelerating electrode 17 will be deflected to a degree sufficient to prevent ion passage through the aperture in the terminal electrode. As a consequence of such deflection no ions will be discharged at the collector electrodes in this interval. The by-pass switch 34 is not a conventional feature of such an instrument and is provided in this instance as a convenient means for interrupting ion currents to the separate amplifiers of the ratio measuring circuit.

Collector electrodes 13 and 13A are connected respectively by leads 38, 38A to a ratio measuring circuit 40, as for example of the type shown in any of Figs. 3, 4 and 5 hereinafter described.

With the switch 34 connected to the tap 35, ions propelled from the ionizing region through the first accelerating electrode 17 are accelerated in the space between the first and second accelerating electrodes and are focused through the aperture in the latter electrode as a heterogeneous beam into the analyzer 12. In the analyzer the beam is resolved under the influence of a transverse magnetic field established by conventional means (not shown) with the individual beams of higher specific mass assuming the largest radii of travel. Diverging beams are focused on the two collectors, variation in focus being accomplished as for example by adjusting the potential applied to the several accelerating electrodes.

Referring to Fig. 3, collector electrodes 13, 13A are connected respectively to separate D. C. amplifiers 42, 43. Usually in isotope measurements, the most abundant isotope is generally of lighter specific mass and the collector 13 on the smaller radius is, therefore, generally the high current collector. Of course, any variation from this generality is readily taken into account by reversing the connections of the collector electrodes with the respective amplifiers. For purposes of this description it is assumed that collector 13 is the high current collector and that the connected D. C. amplifier 43 is the high current amplifier. Amplifier 43 is a feed-back type amplifier of unity gain, the feed-back system being shown diagrammatically as including a lead 44 connected between output lead 45 of the amplifier and a grid resistor 46. The output of the amplifier 43 as applied to lead 45 is fed to a put-and-take divider network 48, the last portion of which is connected across a potentiometer 49 having an adjustable tap 50. Tap 50 is connected through a lead 51 and a lead 52 to grid resistor 53 of amplifier 42 and hence to the input of that amplifier. The amplifier 42 is connected at its output to a converter and A. C. amplifier 56 which is connected through a switch 58 to a motor 60. The converter-amplifier 56 is conventional and serves to develop and amplify an A. C. component of the D. C. output of amplifier 42. The A. C. component is generally produced by means of a so-called "chopper."

The motor 60 is mechanically connected to the adjustable tap 50 of the potentiometer 49 and to a pen 62, forming a part of a recording mechanism 64. To this extent and with the exception of the switch 58 and a variable voltage source 66 intermediate leads 51, 52, the circuit shown in Fig. 3 is conventional and substantially similar to that described in the aforementioned co-pending application of Robert L. Sink.

The method of obtaining an isotope ratio with the circuit as illustrated and as presently described is as follows: With ion beams discharging at the collector electrodes 13A and 13 in the manner heretofore described, current from these electrodes is delivered to the respective amplifiers 42 and 43. The stages of divider 48 are adjusted to maintain the pen 60 on the chart of recorder 64, the divider actually providing the first and second digits of the desired ratio. Current flowing through amplifier 42 from the low current collector disturbs the balance therein, the resultant output of the amplifier being converted to an A. C. variation thereof and amplified in the converter and amplifier 56. The output of this latter unit drives the recording motor 60 to adjust the tap 50 of potentiometer 59. The output of the high current amplifier 43 is connected through the put-and-take divider across the potentiometer 49 and a fraction of the voltage across the potentiometer 49 is fed back to the input of the amplifier 42, the fraction being determined by the setting of the put-take divider 48 and the tap 50. The recording motor 60 adjusts the tap 50 to the point where the tapped off signal balances the signal from the low current collector to extinguish the output of amplifier 42 and hence to deenergize the motor 60. If the current to either of the collectors varies as a result of variation in sample composition, the balance of the system is disturbed accordingly and the recording motor 60 is energized as described to adjust the tap 50 of the potentiometer 49 to return the system to a balanced condition. Pen 62 is linked to the system to record the excursions of the tap 50.

In accordance with the present invention, in the embodiment of Fig. 3 auxiliary voltage source 66 is connected between the tap 50 of the potentiometer 49 and the grid resistor 53 of the low current amplifier 42. The voltage source comprises battery 66A and a slidewire 66B, lead 52 being connected to tap 66C of the slidewire. An auxiliary so-called zero motor 68 is connected to the output of the converter and A. C. amplifier 56 through the switch 58. The switch 58 is in turn ganged to switch 34 (see Fig. 2) in such fashion that when the switch 34 is in the position shown in Figs. 2 and 3, i. e. in an ion beam focusing condition, the output of the converter and amplifier 56 is applied to the recording motor 60. When the switch 34 is moved to contact lead 36 (see Fig. 2) so as to destroy the focus of the ion beam, switch 58 is simultaneously connected to the zero motor 68 thereby isolating recording motor 60. Under these conditions there is no input current deriving from collectors 13 and 13A since there is no ion beam in the mass spectrometer, and any output of the D. C. amplifier 42 is due solely to a zero offset in either or both of the amplifiers 42 and 43. Such a zero offset resulting in an output of the amplifier 42 is applied through the converter and A. C. amplifier 56 to drive the zero motor 68 whereby the auxiliary voltage deriving from source 66 is adjusted to return the system to balance. The ion beam is thereafter turned on by returning the switch 34 and consequently the switch 58 to the positions shown in Figs. 1 and 2, under which circumstances any unbalance in the system is due solely to collected currents and not to zero offset of the amplifiers.

An alternative arrangement for applying the auxiliary balancing voltage is shown in Fig. 4, like portions of this figure bearing corresponding reference characters to the circuit of Fig. 3. In Fig. 4 a single motor 70 is used to alternately drive both the tap 50 of the potentiometer 49 and the recording pen 62, or the tap 66C of the auxiliary voltage source 66. In this case the switch 34 (see Fig. 1) is ganged to a switch 72, the latter having an open contact 72A and a contact 73A connected through a battery 74 to a solenoid coil 76. Output shaft 70A of motor 70 is provided with a drive gear or wheel 78. A take-off gear or wheel 79 is associated with the gear 78 and is driven responsive to rotation of the latter to adjust the tap 50 of potentiometer 49. A second take-off gear 82 is mounted adjacent the drive gear 78 and is spring-loaded in a disengaged position. The drive gear 82 is connected to drive the tap 66A of the auxiliary voltage source 66. When the solenoid 76 is energized responsive to positioning of switch 34 in the ion beam off-position, take-off wheel 82 is urged into contact with the gear 78 to effectuate any necessary adjustment of tap 66C for the purpose hereinafter described.

It is not essential in such a ratio measuring circuit that a fractional portion of the output of one amplifier be applied to the input of the other. The same end results are achieved by comparison of the outputs of the two amplifiers. A circuit of this type is shown in Fig. 5. This circuit includes "high" and "low" current amplifiers 43, 42 respectively connected to receive ion currents from corresponding collectors 13, 13A, a voltage divider network including divider 48 and a potentiometer 49, a converter-amplifier circuit 56 and a servomotor 60.

In this embodiment a variable voltage source 90 is serially connected in the output of low current amplifier. As in the foregoing embodiments the auxiliary variable voltage source 90 may include a battery 90A connected across a slidewire 90B. The tapped off output of slidewire 90B and the tap 50 of potentiometer 49 are connected into the converter amplifier 56 which delivers to the motor 60 a signal proportionate to the algebraic sum of the two input signals. The motor is separately connected to position the tap of slidewire 90B and tap 50 of potentiometer 49, selection therebetween being conveniently accomplished as in the system of Fig. 4. Alternatively, converter-amplifier 56 may be connected to two separate motors respectively connected to the two taps with provision to selectively energize the two motors responsive to the on or off condition of the ion beam. Such a system is shown in Fig. 3.

The means of turning the ion beam on and off as illustrated and described represents only one of a number of ways of accomplishing the same purpose, namely the interruption of signal input into the amplifiers 42 and 43. It is to be understood that the invention is not limited to isotope ratio mass spectrometry techniques since it is of considerable value regardless of the derivation of the input signals to the amplifiers 42 and 43 and in any comparison circuit wherein drift of such amplifiers is a problem.

I claim:
1. In a D. C. amplifier circuit including an input for receiving introduced signals, the combination comprising a variable voltage source connected in parallel to the input, and electro-mechanical means connected to the output of the amplifier to vary the voltage output of the variable source responsive to output of the amplifier with zero input.

2. In a D. C. amplifier circuit including an input for receiving introduced signals, the combination comprising a variable voltage source connected in parallel to the input, a converter amplifier connected in parallel to the D. C. amplifier output, and means connected to the output of the converter amplifier to vary the voltage output of the variable source responsive to output of the converter amplifier.

3. In a D. C. amplifier circuit including an input for receiving introduced signals, the combination comprising a variable voltage source connected in parallel to the input, a converter amplifier connected in parallel to the D. C. amplifier output, means connected to the output of the converter amplifier to vary the voltage output of the variable source responsive to output of the converter amplifier, and means for alternately connecting and disconnecting the converter amplifier to the D. C. amplifier output and for simultaneously discontinuing the introduced signals for the period of connection of the converter amplifier.

4. In a D. C. amplifier circuit including an input for receiving introduced signals and a feed-back loop connected between the output and input, the combination comprising a variable voltage source serially connected in the feed-back loop, a converter amplifier connected in parallel to the D. C. amplifier output, and a servomotor connected to the output of the converter amplifier and mechanically connected to vary the voltage output of the variable source responsive to output of the converter amplifier.

5. In a D. C. amplifier circuit including an input for receiving introduced signals and a feed-back loop connected between the output and input, the combination comprising a variable voltage source serially connected in the feed-back loop, a converter amplifier connected in parallel to the D. C. amplifier output, a servomotor connected to the output of the converter amplifier and mechanically connected to vary the voltage output of the variable source responsive to output of the converter amplifier, and means for alternately connecting and disconnecting the converter amplifier and D. C. amplifier output and for simultaneously discontinuing the introduced signals for the period of connection of the converter amplifier.

6. In a comparison circuit including first and second D. C. amplifiers connected to receive signals to be compared, voltage divider means connected to the output of the first amplifier, means for connecting a tapped off portion of the voltage divider means to the second amplifier circuit and means responsive to the output of the second amplifier to adjust the tap to balance the circuit, the combination comprising a variable voltage source connected between the tap of the potentiometer and the second amplifier, and means operable responsive to unbalance output of the second amplifier to vary the voltage of the variable source to balance such output.

7. In a comparison circuit including first and second D. C. amplifiers connected to receive signals to be compared, a potentiometer connected to the output of the first amplifier, the tap of the potentiometer being connected to the input of the second amplifier, and means responsive to the output of the second amplifier to adjust the tap to balance the circuit, the combination comprising a variable voltage source connected between the tap of the potentiometer and the second amplifier, and means operable responsive to unbalance output of the second amplifier to vary the voltage of the variable source to balance such output.

8. In a comparison circuit including first and second D. C. amplifiers connected to receive signals to be compared, a potentiometer connected to the output of the first amplifier, the tap of the potentiometer being connected to the output of the second amplifier, and means responsive to output of the second amplifier to adjust the tap to balance the circuit, the combination comprising a variable voltage source connected between the tap of the potentiometer and the second amplifier, and means operable responsive to unbalance output of the second amplifier to vary the voltage of the variable source to balance such output.

9. In a comparison circuit including first and second D. C. amplifiers connected to receive signals to be compared, a potentiometer connected to the output of the first amplifier, the tap of the potentiometer being connected to the second amplifier circuit and means responsive to output of the second amplifier to adjust the tap to extinguish the output, the combination comprising a variable voltage source connected between the tap of the potentiometer and the second amplifier, means connected to interrupt the signals to the amplifiers, and means operable responsive to unbalance output of the second amplifier when said signals are interrupted to vary the voltage of the variable source to balance such output.

10. In a comparison circuit including first and second D. C. amplifiers connected to receive signals to be compared, a potentiometer connected to the output of the first amplifier, the tap of the potentiometer being connected to the second amplifier circuit and means responsive to output of the second amplifier to adjust the tap to extinguish the output, the combination comprising a variable voltage source connected between the tap of the potentiometer and the second amplifier, control means operable to vary the voltage of the variable source, means connected to interrupt the signals to the amplifiers, and means simultaneously operable to connect said control means to the output of the second amplifier.

References Cited in the file of this patent

UNITED STATES PATENTS

| 2,424,146 | Caldwell et al. | July 15, 1947 |
| 2,446,153 | Belcher, Jr. | July 27, 1948 |
| 2,456,426 | Nier et al. | Dec. 14, 1948 |

FOREIGN PATENTS

| 620,140 | Great Britain | Mar. 21, 1949 |